United States Patent
Heasley et al.

(10) Patent No.: US 7,624,068 B1
(45) Date of Patent: Nov. 24, 2009

(54) METHOD AND SYSTEM FOR DYNAMICALLY ADJUSTING DISCOUNT RATES FOR A CARD TRANSACTION

(75) Inventors: Philip G. Heasley, Naples, FL (US); Frank J. Partel, Jr., Bryn Mawr, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 719 days.

(21) Appl. No.: 10/920,398

(22) Filed: Aug. 18, 2004

Related U.S. Application Data

(60) Provisional application No. 60/495,709, filed on Aug. 18, 2003.

(51) Int. Cl.
*G06Q 40/00* (2006.01)

(52) U.S. Cl. ............... 705/38; 705/39; 705/40; 705/41

(58) Field of Classification Search ............... 705/39–41
See application file for complete search history.

(56) References Cited

U.S. PATENT DOCUMENTS

| | | | |
|---|---|---|---|
| 3,634,669 A | 1/1972 | Soumas et al. | |
| 4,254,474 A | 3/1981 | Elbaum et al. | |
| 4,338,587 A | 7/1982 | Chiappetti | |
| 4,346,442 A | 8/1982 | Musmanno | |
| 4,355,372 A | 10/1982 | Goldberg et al. | |
| 4,376,978 A | 3/1983 | Musmanno | |
| 4,597,046 A | 6/1986 | Musmanno et al. | |
| 4,598,367 A | 7/1986 | DeFrancesco et al. | |
| 4,642,768 A | 2/1987 | Roberts | |
| 4,674,042 A | 6/1987 | Hernandez et al. | |
| 4,674,044 A | 6/1987 | Kalmus et al. | |
| 4,736,294 A | 4/1988 | Le Grand et al. | |
| 4,739,478 A | 4/1988 | Finnerty et al. | |

(Continued)

FOREIGN PATENT DOCUMENTS

EP 0597316 5/1994

(Continued)

OTHER PUBLICATIONS

Cardoffers.com, Kmart Platinum Rocks, Jazzy Jeff, Feb. 25, 2003.*

(Continued)

*Primary Examiner*—Daniel S Felten
*Assistant Examiner*—William E Rankins
(74) *Attorney, Agent, or Firm*—Hunton & Williams, LLP

(57) ABSTRACT

According to one embodiment, the present invention relates to a method and a system for dynamically adjusting discount rates for a closed loop transaction. A computer implemented method for dynamically adjusting discount rates for a card transaction comprises the steps of identifying credit worthiness of at least one consumer; assigning a credit level to a line of credit associated with a credit product for the at least one consumer wherein the credit product is accepted at an identified one or more merchants; assigning a financing charge to the line of credit; determining a discount rate based at least in part on the credit worthiness of the at least one consumer; and applying the discount rate when at least one transaction is made with the credit product; wherein the applied discount rate is adjusted based on the credit worthiness of the at least one consumer.

30 Claims, 5 Drawing Sheets

U.S. PATENT DOCUMENTS

| | | |
|---|---|---|
| 4,760,604 A | 7/1988 | Cooper |
| 4,774,663 A | 9/1988 | Musmanno et al. |
| 4,831,526 A | 5/1989 | Luchs |
| 4,859,187 A | 8/1989 | Peterson |
| 4,859,837 A | 8/1989 | Halpern |
| 4,866,634 A | 9/1989 | Reboh |
| 4,897,811 A | 1/1990 | Scofield |
| 4,903,201 A | 2/1990 | Wagner |
| 4,972,504 A | 11/1990 | Daniel, Jr. |
| 5,041,972 A | 8/1991 | Frost |
| 5,093,907 A | 3/1992 | Hwong et al. |
| 5,220,500 A | 6/1993 | Baird |
| 5,220,501 A | 6/1993 | Lawlor |
| 5,227,874 A | 7/1993 | Von Kohorn |
| 5,231,571 A | 7/1993 | D'Agostino |
| 5,245,535 A | 9/1993 | Weiss et al. |
| 5,278,751 A | 1/1994 | Adiano |
| 5,297,032 A | 3/1994 | Trojan et al. |
| 5,321,933 A | 6/1994 | Seifert et al. |
| 5,351,187 A | 9/1994 | Hassett |
| 5,381,470 A | 1/1995 | Cambray et al. |
| 5,396,621 A | 3/1995 | MacGregor et al. |
| 5,444,844 A | 8/1995 | Inoue |
| 5,481,647 A | 1/1996 | Brody |
| 5,490,060 A | 2/1996 | Malec |
| 5,502,805 A | 3/1996 | Anderson et al. |
| 5,523,942 A | 6/1996 | Tyler |
| 5,550,734 A | 8/1996 | Tarter |
| 5,551,021 A | 8/1996 | Harada |
| 5,583,778 A | 12/1996 | Wind |
| 5,592,590 A | 1/1997 | Jolly |
| 5,603,025 A | 2/1997 | Tabb |
| 5,606,496 A | 2/1997 | D'Agostino |
| 5,611,052 A | 3/1997 | Dykstra |
| 5,615,109 A | 3/1997 | Eder |
| 5,615,341 A | 3/1997 | Srikant et al. |
| 5,623,591 A | 4/1997 | Cseri |
| 5,644,727 A | 7/1997 | Atkins |
| 5,649,116 A | 7/1997 | McCoy |
| 5,655,085 A | 8/1997 | Ryan |
| 5,657,388 A | 8/1997 | Weiss |
| 5,657,437 A | 8/1997 | Bishop et al. |
| 5,657,460 A | 8/1997 | Egan et al. |
| 5,664,127 A | 9/1997 | Anderson et al. |
| 5,671,363 A | 9/1997 | Cristofich et al. |
| 5,675,746 A | 10/1997 | Marshall |
| 5,689,650 A | 11/1997 | McClelland et al. |
| 5,717,865 A | 2/1998 | Stratmann |
| 5,721,847 A | 2/1998 | Johnson |
| 5,727,161 A | 3/1998 | Purcell, Jr. |
| 5,732,397 A | 3/1998 | DeTore |
| 5,758,328 A | 5/1998 | Giovannoli |
| 5,764,923 A | 6/1998 | Tallman et al. |
| 5,765,144 A | 6/1998 | Larche |
| 5,768,158 A | 6/1998 | Adler et al. |
| 5,774,878 A | 6/1998 | Marshall |
| 5,774,883 A | 6/1998 | Andersen |
| 5,799,286 A | 8/1998 | Morgan et al. |
| 5,802,502 A | 9/1998 | Gell |
| 5,812,968 A | 9/1998 | Hassan et al. |
| 5,819,237 A | 10/1998 | Garman |
| 5,842,178 A | 11/1998 | Giovannoli |
| 5,852,811 A | 12/1998 | Atkins |
| 5,870,721 A | 2/1999 | Norris |
| 5,873,096 A | 2/1999 | Lim |
| 5,875,437 A | 2/1999 | Atkins |
| 5,878,258 A | 3/1999 | Pizi et al. |
| 5,878,403 A | 3/1999 | Agrawal et al. |
| 5,913,202 A | 6/1999 | Motoyama |
| 5,918,217 A | 6/1999 | Maggioncalda |
| 5,920,848 A | 7/1999 | Schutzer |
| 5,930,775 A | 7/1999 | MacCauley |
| 5,940,811 A | 8/1999 | Norris |
| 5,940,812 A | 8/1999 | Tengel |
| 5,950,175 A | 9/1999 | Austin |
| 5,963,953 A | 10/1999 | Cram |
| 5,970,467 A | 10/1999 | Alavi |
| 5,974,396 A | 10/1999 | Anderson |
| 5,978,779 A | 11/1999 | Stein et al. |
| 5,983,206 A | 11/1999 | Oppenheimer |
| 5,987,434 A | 11/1999 | Libman |
| 5,991,741 A | 11/1999 | Speakman et al. |
| 5,995,942 A | 11/1999 | Smith |
| 5,999,907 A | 12/1999 | Donner |
| 6,008,817 A | 12/1999 | Gilmore, Jr. |
| 6,009,415 A | 12/1999 | Shurling et al. |
| 6,018,722 A | 1/2000 | Ray et al. |
| 6,021,397 A | 2/2000 | Jones et al. |
| 6,026,370 A | 2/2000 | Jermyn |
| 6,029,139 A | 2/2000 | Cunningham |
| 6,029,195 A | 2/2000 | Herz |
| 6,032,125 A | 2/2000 | Ando |
| 6,044,371 A | 3/2000 | Person et al. |
| 6,055,510 A | 4/2000 | Henrick |
| 6,055,517 A | 4/2000 | Friend et al. |
| 6,064,985 A | 5/2000 | Anderson |
| 6,070,147 A | 5/2000 | Harms |
| 6,073,115 A | 6/2000 | Marshall |
| 6,076,072 A | 6/2000 | Libman |
| 6,078,892 A | 6/2000 | Anderson |
| 6,078,901 A | 6/2000 | Ching |
| 6,088,686 A | 7/2000 | Walker et al. |
| 6,089,284 A | 7/2000 | Kaehler et al. |
| 6,092,050 A | 7/2000 | Lungren et al. |
| 6,097,391 A | 8/2000 | Wilcox |
| 6,108,641 A | 8/2000 | Kenna et al. |
| 6,122,623 A | 9/2000 | Garman |
| 6,154,731 A | 11/2000 | Monks et al. |
| 6,173,270 B1 | 1/2001 | Cristofich et al. |
| 6,185,582 B1 | 2/2001 | Zellweger et al. |
| 6,188,403 B1 | 2/2001 | Sacerdoti et al. |
| 6,188,405 B1 | 2/2001 | Czerwinski et al. |
| 6,188,993 B1 | 2/2001 | Eng et al. |
| 6,195,092 B1 | 2/2001 | Dhond et al. |
| 6,199,077 B1 | 3/2001 | Inala et al. |
| 6,202,053 B1 | 3/2001 | Christiansen et al. |
| 6,202,054 B1 | 3/2001 | Lawlor et al. |
| 6,205,453 B1 | 3/2001 | Tucker et al. |
| 6,212,494 B1 | 4/2001 | Boguraev |
| 6,222,557 B1 | 4/2001 | Pulley, IV et al. |
| 6,236,978 B1 | 5/2001 | Tuzhilin |
| 6,243,093 B1 | 6/2001 | Czerwinski et al. |
| 6,249,775 B1 | 6/2001 | Freeman et al. |
| 6,256,649 B1 | 7/2001 | Mackinlay et al. |
| 6,263,320 B1 | 7/2001 | Danilunas et al. |
| 6,269,346 B1 | 7/2001 | Cristofich et al. |
| 6,271,863 B1 | 8/2001 | Bose et al. |
| 6,278,981 B1 | 8/2001 | Dembo et al. |
| 6,282,551 B1 | 8/2001 | Anderson et al. |
| 6,311,144 B1 | 10/2001 | Abu El Ata |
| 6,317,726 B1 | 11/2001 | O'Shaughnessy |
| 6,317,750 B1 | 11/2001 | Tortolani et al. |
| 6,321,212 B1 | 11/2001 | Lange |
| 6,330,551 B1 | 12/2001 | Burchetta et al. |
| 6,349,290 B1 | 2/2002 | Horowitz et al. |
| 6,349,291 B1 | 2/2002 | Varma |
| 6,360,188 B1 | 3/2002 | Freidman et al. |
| 6,363,393 B1 | 3/2002 | Ribitzky |
| 6,405,204 B1 | 6/2002 | Baker et al. |
| 6,452,613 B1 | 9/2002 | Lefebvre et al. |
| 6,490,569 B1 | 12/2002 | Grune et al. |
| 6,496,832 B2 | 12/2002 | Chi et al. |
| 6,502,080 B1 | 12/2002 | Eichorst et al. |
| 6,513,018 B1 | 1/2003 | Culhane |

| | | | |
|---|---|---|---|
| 6,597,379 | B1 | 7/2003 | Morris et al. |
| 6,601,044 | B1 | 7/2003 | Wallman |
| 6,624,752 | B2 | 9/2003 | Klitsgaard et al. |
| 6,725,257 | B1 | 4/2004 | Cansler et al. |
| 6,741,975 | B1 | 5/2004 | Nakisa et al. |
| 6,785,661 | B1 * | 8/2004 | Mandler et al. ............... 705/39 |
| 6,850,923 | B1 | 2/2005 | Nakisa et al. |
| 6,892,052 | B2 | 5/2005 | Kotola et al. |
| 6,985,880 | B1 | 1/2006 | Hodgdon et al. |
| 6,999,943 | B1 * | 2/2006 | Johnson et al. ............... 705/39 |
| 7,181,427 | B1 | 2/2007 | DeFrancesco et al. |
| 7,406,442 | B1 * | 7/2008 | Kottmeier et al. ............. 705/35 |
| 7,409,364 | B1 | 8/2008 | Barton et al. |
| 2001/0011243 | A1 | 8/2001 | Dembo et al. |
| 2001/0027437 | A1 | 10/2001 | Turbeville et al. |
| 2001/0056398 | A1 | 12/2001 | Scheirer |
| 2002/0007330 | A1 | 1/2002 | Kumar et al. |
| 2002/0019791 | A1 | 2/2002 | Goss et al. |
| 2002/0019802 | A1 | 2/2002 | Malme et al. |
| 2002/0019803 | A1 | 2/2002 | Muller |
| 2002/0059139 | A1 | 5/2002 | Evans |
| 2002/0067373 | A1 | 6/2002 | Roe et al. |
| 2002/0073005 | A1 | 6/2002 | Welnicki et al. |
| 2002/0078086 | A1 | 6/2002 | Alden et al. |
| 2002/0111850 | A1 | 8/2002 | Smrcka et al. |
| 2002/0111890 | A1 | 8/2002 | Sloan et al. |
| 2002/0133383 | A1 | 9/2002 | Chao et al. |
| 2002/0147668 | A1 | 10/2002 | Smith et al. |
| 2002/0198797 | A1 | 12/2002 | Cooper et al. |
| 2003/0018492 | A1 | 1/2003 | Carlson |
| 2003/0028466 | A1 | 2/2003 | Jenson et al. |
| 2003/0061132 | A1 | 3/2003 | Yu, Sr. et al. |
| 2003/0061137 | A1 | 3/2003 | Leung et al. |
| 2003/0093351 | A1 | 5/2003 | Sarabanchong |
| 2003/0212628 | A1 | 11/2003 | Kuttan et al. |
| 2003/0216965 | A1 | 11/2003 | Libman |
| 2003/0229582 | A1 | 12/2003 | Sherman et al. |
| 2004/0030626 | A1 | 2/2004 | Libman |
| 2004/0039588 | A1 | 2/2004 | Libman |
| 2004/0054610 | A1 | 3/2004 | Amstutz et al. |
| 2004/0054622 | A1 * | 3/2004 | Strayer et al. ................. 705/39 |
| 2004/0117300 | A1 * | 6/2004 | Jones et al. .................... 705/39 |
| 2004/0186773 | A1 | 9/2004 | George et al. |
| 2004/0236641 | A1 | 11/2004 | Abbott et al. |
| 2004/0267651 | A1 | 12/2004 | Jenson et al. |
| 2005/0004855 | A1 | 1/2005 | Jenson et al. |
| 2005/0004856 | A1 | 1/2005 | Brose et al. |
| 2005/0010510 | A1 | 1/2005 | Brose et al. |
| 2005/0027632 | A1 | 2/2005 | Zeitoun et al. |
| 2005/0060252 | A1 | 3/2005 | Doddington |
| 2005/0144108 | A1 | 6/2005 | Loeper |

FOREIGN PATENT DOCUMENTS

| | | |
|---|---|---|
| JP | 2002-163589 | 6/2002 |
| WO | WO 99/27479 | 6/1999 |
| WO | WO 00/02256 | 1/2000 |
| WO | WO 02/069212 | 9/2002 |

OTHER PUBLICATIONS

Cardweb.com, Kmart MasterCard (Sep. 26, 2000).*
Boycott Threat Spurs American Express to Rethink Fees Pae, Peter. Wall Street Journal. (Eastern edition). New York, N.Y.: Mar. 28, 1991. p. B1.*
AmEx-Costco Co-brand: Is It A Marketing Or Merchant Acceptance Strategy? Card News. Potomac: Aug. 25, 1999. vol. 14, Iss. 16; p. 1.*
Jazzy Jeff, Credit Card Commentaries; cardoffers.com 2003.
Hinds, Michael, Making the Most of Fast Falling Mortgage Rates.
Hickman, Using Software to Soften Big-Time Competition, Bank Systems and Technology, vol. 31, No. 8, Jun. 1994, pp. 38-40.
Roger et al., A credit scoring model to evaluate the credit worthiness of credit card applicants, Developments in Marketing Science, vol. 5, 1982, 3 pages.
Pourmokhtar, A hedge fund primer version 0.1, www.emf.net, printed Jul. 24, 2002, 5 pages.
Taylor et al., Card issuers turn to scoring as they face increasing risk, Financial Services Report, vol. 8, No. 15, 1 page, Jul. 24, 1991, 3 pages.
Friedland, Credit scoring digs deeper into data, Credit World, vol. 84, No. 5, pp. 19-23, May, 1996, 3 pages.
Trading and Capital-Markets Activities Manual, Instrument Profiles: Structured Notes, www.toerien.com, printed Jul. 24, 2002, 14 pages.
Dodd, Primer: Derivatives Instruments, Derivatives Study Center, www.econstrat.org, printed Jul. 24, 2002, 8 pages.
Huddling with William Bernstein: Small Town Doctor, Investing Pro, 3 pages (Author, Source & Date Unknown).
Hedge Fund Strategies: A Primer, canadianhedgewatch, 1 page (Author & Date Unknown).
Hedge Fund Primer: About Fund of Funds, www.hedgefund.net, printed Jul. 24, 2002, 2 pages.
Hedge Fund Primer, Online Education About Hedge Funds, The Basics www.kspcapital.com, printed Jul. 24, 2002, 18 pages.
Armstrong, Fund of Funds: Perfect Solution or Dangerous Shortcut?, Investor Solutions, Inc., www.investorsolutions.com, printed Jul. 24, 2002, 3 pages.
Wall Street Journal Nov. 7, 2002, Fidelity Helps Fund Sellers Trim the Taxes They'll Owe, 2 pages.
Using Software to Soften Big-Time Competition, Bank Systems Technology, vol. 31, No. 8, pp. 38-40, Jun. 1994, (2 pages).
Portner, There Must Be A Better Way, Mortgage Banking, vol. 5, No. 2, pp. 12-22, Nov. 1992, 8 pages.
Carey, The Sub-Prime Credit Market: Identifying Good Risks for Unsecured Cards, Credit World, vol. 85, No. 1, pp. 13-15, Sep. 1996, 4 pages.
Sullivan, Scoring borrower risk, Mortgage Banking, vol. 55, No. 2, pp. 94-98, Nov. 1994, 6 pages.
Opportunity Knocks at Scoring's Door (Trends and developments in scoring technology examined; scoring now is used for everything from prescreening credit card applicants to debt collections), Collections & Credit Risk, vol. 2, No. 4, pp. 53+, Apr. 1997, 6 pages.
Makuch et al., Managing Consumer Credit Delinquency in the S Economy: A Multi-Billion Dollar Management Science Application, Interfaces 22: 1, Jan.-Feb. 1992, pp. 90-109, 8 pages.
Asch, How the RMA/Fair, Isaac credit-scoring model was built, Journal of Commercial Lending, vol. 77, No. 10, pp. 10-16, Jun. 1995, 6 pages.
Jameson, Expanding Risk Management Strategies: Key to Future Survival, Credit World, vol. 84, No. 5, pp. 16-18, May 1996, 3 pages.
Quinn, Credit Card Issuers Keeping a Closer Watch on How You Pay Bills, Washington Post, Staying Ahead, Apr. 25, 1988, Business Section P6, 1 page.
Credit scoring new markets, Bank Technology News, vol. 9, No. 7, Jul., 1996, 5 pages.
Ceiba, Derivatives primer, Committee on Investment of Employee Benefit Assets, Association for Financial Professionals, 11 pages.
Why a Fund of Funds, www.managedinvestments.com, printed Jul. 24, 2002, 2 pages.
At Your Request, www.wingspanbank.com, Sep. 28, 1999.
CSU/DSU (Channel Service Unit/Data Service Unit), CTI (Computer-Telephony Integration), pp. 208-210.
Markese, Can You Trust Mutual Fund Rankings?, Consumers' Research Magazine, vol. 76, No. 10, Research Library, Oct. 1993, p. 20.
Cumby et al., Evaluating the Performance of International Mutual Funds, The Journal of Finance, vol. 45, No. 2, Jun. 1990, pp. 497-521.
FreeMarkets, printed on Apr. 26, 1999.
GS-Calc 6.0.1.1.; JPS Development; http://download.com, printed Sep. 3, 2003.
Gottfried et al., Graphical definitions: making spreadsheets visual through direct manipulation and gestures, Visual Languages, 1997, Proceedings, 1997 IEEE Symposium on, Sep. 23-26, 1997, pp. 246-253, Abstract.
Buchner et al., HotDoc: a flexible framework for spatial composition, Visual Languages, 1997, Proceedings, 1997 IEEE Sympsium, Abstract, Sep. 23-26, 1997, pp. 92-99.

Snyder et al., Identifying design requirements using analysis structures, Aerospace and Electronics Conference, 1991, NAECON, 1991, vol. 2, Abstract, May 20-24, 1991, pp. 786- 792.

Meredith, Internet bank moves closer to virtual reality, USA Today, May 05, 1995.

Kmart Mastercard—cardweb.com 2000.

Internet, Lending Tree, Mortgage Apply Online in Minutes, www.lendingtree.com, 7 pages, printed Feb. 1, 1999.

Reid, Alice, Metro Ready to Use High Tech Far System; Selling.

Bogle, Mutual Funds at the Millennium: Fund Directors and Fund Myths, The Vanguard Group to the '40 Act Institute of PLI (Practicing Law Institute), New York, NY, May 15, 2000, 15 pages.

Davenport et al., Numbers-a medium that counts [spreadsheet software]; Computer Graphics and Applications; IEEE; vol. 11; Issue 4; Abstract, Jul. 1991, pp. 39-44.

Stolte et al., Polaris: a system for query, analysis, and visualization of multidimensional relational databases; Visualization and Computer Graphics; IEEE Transactions on; vol. 8; Issue 1; Abstract, Jan./Mar. 2002, pp. 52-65.

Chi et al., Principles for information visualization spreadsheets; Computer Graphics and Applications; IEEE; vol. 18; Issue 4; Abstract, Jul./Aug. 1998, pp. 92-99.

Product Data Integration Technologies, Inc., Step Integratin Authors, printed on Apr. 26, 1999.

Spreadsheet Mapper; www.panopticon.com., printed Oct. 01, 2003.

TCS 4.20; Telsys sas; http://download.com, printed Sep. 30, 2003.

Mclaughlin, Tapping Web to Search for Right Fund—FundProfiler Speeds Search, Boston Herald, Boston, MA, Dec. 16, 1999, p. 70.

Anonymous, Two Chips Can Be Better Than One.

Storms, Phillip, Using Mortgage Credit to Achieve Client Objectives, Journal of Financial Planning, ISSN/ISBN: 10403981, Proquest Document ID: 10403981, vol. 9, Issue 5, 9 pages, Oct. 1996.

Storms, Phillip, Using Mortgage Credit to Achieve Client Objectives, Journal of Financial Planning, ISSN/ISBN: 10403981; Proquest document ID:10403981; Denver: vol. 9; Issue 5; 9 pages, Oct. 1996.

Spoerri, Visual tools for information retrieval; Visual Languages; 1993; Proceedings; 1993 IEEE Symposium on; pp. 160-168; Abstract.

Spirer, When Bad Credit Behavior Becomes the Norm, Credit World, vol. 85, Iss. 6, Jul./Aug. 1997, p. 18.

* cited by examiner

METHOD AND SYSTEM FOR DYNAMICALLY ADJUSTING DISCOUNT RATES FOR A CARD TRANSACTION

CROSS-REFERENCE TO RELATED APPLICATIONS

The present application claims priority to U.S. Provisional Patent Application No. 60/495,709, filed Aug. 18, 2003, which is hereby incorporated by reference herein in its entirety.

FIELD OF THE INVENTION

The present invention relates generally to adjusting discount rates and, more particularly, to a method and system for dynamically adjusting discount rates for a transaction based at least in part on consumer risk thereby shifting the premium for consumer risk to a merchant entity.

BACKGROUND OF THE INVENTION

As the card business has become more sophisticated, it has also disaggregated into a non-monolithic structure. There are some players that perform most of the functions in-house while many others have out-sourced functions to third party providers. The most common operating model is to retain operating control over the Three Cs—credit, customer service, and collections—although sub-systems may be licensed to execute these functions. Cardholders generally refer to consumers and businesses that have accounts with issuers. Issuers solicit credit card accounts, extend credit, stimulate activity and usage, perform customer service, collect payments, and manage cardholder risk. Merchants may be any business, not-for-profit or government organization engaged in exchanging value via credit cards. Credit sales are settled to a merchant's demand deposit account (DDA) that the merchant has with a commercial bank, also referred to as the merchant bank. Acquirers may be referred to as "merchant processors." Acquirers purchase credit sales from merchants and forward the balances to issuers. In order to do this, an authorization process obtains, transports and routes data to enable authorization and electronic settlement between/among issuers, acquirers, and the bank where the merchant maintains an account to receive cash credit card receipts.

Card associations set the operating rules and enforce them with various constituents in the industry. They also act as a common utility and operate the communications network, the switching and routing function, and certain back-up and stand-in functions, such as authorizations. Card associations are also significantly engaged in globally developing and maintaining brand equity and card acceptance. Almost any function can be out-sourced to third party providers. Usually but not in all cases, the decisioning criteria may be set by an industry client entity and an outsourcer may act as an agent performing functions in accordance with contractual specifications set by the client entity. Such functions may include credit granting; application processing; plastics issuing; accounts receivable processing (e.g., applying entries, computing balances and interest, etc.); statement rendition and mailing; payment processing; authorization processing, switching, and routing; risk management algorithms—application scoring, behavioral scoring, fraud controls; selling merchants; purchasing credit card sales; settlement processing; customer service; and collections, both pre and post write-off.

Regulators may include banking entities within the industry that are regulated by various federal and state regulators. Through the interstate commerce clause and other powers given by Congress, the federal government regulates fair credit granting, fair credit reporting, fair debt collection, and consumerist issues via the Federal Trade Commission (FTC). Federal courts have also defined distinctions between loans and credit purchases—a subtle distinction where purchases generally are freed of state regulations for usury and terms and conditions making purchases more flexible transactions. States regulate interest rates, fees both directly and indirectly (via usury limits) and terms and conditions for accounts which have been extended credit from within their states. Card issuers with national charters or who are insured by the Federal Deposit Insurance Corporation (FDIC) can export rates across state lines such that an issuer who performs the credit-granting function in Delaware may charge Delaware rates to a Maryland customer without regard to Maryland law. As a result, issuers locate their credit-granting functions in states with favorable laws such as Delaware, South Dakota, Nevada, and New Hampshire. Retailers who extend credit are granted the right to do so through the Retail Installment Credit Act (RICA) but are expected to comply with all state laws. As a result, retailers are severely limited in their ability to manage risk by usury law constraints (unless they obtain a bank charter) and have the de facto and de jure inefficiencies of operating in 50 different jurisdictions.

According to a general purpose credit card (GPCC) economic compensation model, there are three sources of revenue in the industry which include finance charge income, fees and discount income. Finance charge income is the gross annual percentage rate (APR) of interest collected from cardholders. This typically yields less than the nominal APR because of the portion of balances which are paid in full each month and earn no interest. These balances are attributable to cardholders who do not use the cash flow financing benefits of the card and are typically rewards-seekers who spend liberally on the card but pay their balances off each month. Issuers also fund the receivable at their cost of funds, so in practice, the spread, or interest differential, is the real source of revenue.

Fees are applied for late payments, over credit limit transactions, supplementary cards and having an active account, etc. Competitive factors may make it difficult to impose all of these fees. Fees are also earned by selling credit-related services such as credit life insurance, lost card insurance, reporting services, marketing affiliations, and/or other services.

Discount income is earned from credit sales purchased from retailers. The discount is intended to cover the transaction cost, the cost of financing receivables that are paid off in less than 30 days and earn no interest, and as compensation for presenting a merchant with a customer who is creditworthy and eligible to make a purchase with credit. The actual discount charged to the merchant may result from negotiations with the acquirer. The acquirer considers profitability factors, such as business volume, fraud rates, average ticket size, etc. when an offer is made. Generally, an acquirer may have two known pricing components—fees paid to the associations and interchange fee paid to the issuer—and the residual which covers the acquirer's operating expense and profit. The interchange rate may be set by the card association. In practice, interchange varies by type of card—generally these are GPCC cards, non-revolving cards, and procurement cards. While rates may vary from card to card, the model is substantially similar. Discount income may be typically split three ways: the acquirer retains a portion; a small portion is paid to the card association for services; and a portion, referred to as "interchange" is forwarded to the card issuer.

Consumers of higher risk or less credit worthiness are generally extended credit at premium (e.g., higher) interest rates to cover the risk. Accordingly "weak credits" are further stressed by the adverse cash flow implications of premium interest rates. The balance is increased by the amount of money calculated by the higher interest rates. The cost of borrowing discourages spending and lowers consumer confidence. While there is a higher amount of risk associated with extending credit to such individuals, there are valid reasons for providing all consumers access to credit, even at a premium cost of borrowing.

Merchants generally make a certain margin on the goods and services sold. Full service merchants may have mark-ups of 50% and some discounters may have a mark-up of 27% margin. Credit card transactions are actually the purchase transaction where the discount rates and/or interchange fees may be applied. A discount rate is applied to the credit sale, advancing the net amount after subtracting the discount from the gross sale in accordance with the contract through the acquirer. The discount rate for a general purpose credit card ("GPCC") is negotiated between the acquirer and the merchant. For example, a typical GPCC discount rate may be 250 basis points or 2.5%. From the discount rate, the Merchant Processor pays an interchange fee to a Credit Card Issuer, an assessment fee to a Card Association, and the residual is provided to cover the acquirer's operating expense and profit.

Interchange fees may include fees paid by a Merchant via Merchant Acquirer to a credit card issuer, such as Card Issuing Bank, for transactions that are processed through interchange. Interchange may represent a clearing and settlement system where data is exchanged between a Card Association and a Card Issuing Bank. Interchange fees may be set to compensate for risk and operating expenses involved in processing a transaction. Interchange fees vary depending on the type of card presented, how it is processed, the type of merchant accepting the credit card and/or other criteria.

As an applicant applies for a credit card, the applicant may be examined to determine whether the applicant is creditworthy. Each credit card issuer may have specific standards determining whether to offer credit to that individual and at what rate. According to some credit card systems, there are several different categories that an individual may be placed in which the applicant is "risk-rated" and levied finance charges (and interest rates) in accordance with their risk rating (e.g., higher risk, higher finance charge and interest rates).

In view of the foregoing, it would be desirable to provide a method and system for dynamically adjusting discount rates which overcomes the above-described inadequacies and shortcomings.

SUMMARY OF THE INVENTION

According to an embodiment of the present invention, a method and a system provides for dynamically adjusting discount rates for a transaction based at least in part on consumer risk thereby shifting the premium for consumer risk to a merchant entity.

According to an exemplary embodiment of the present invention, a computer implemented method for dynamically adjusting discount rates for a card transaction comprises the steps of identifying credit worthiness of at least one consumer; assigning a credit level to a line of credit associated with a credit product for the at least one consumer wherein the credit product is accepted at an identified one or more merchants; assigning a financing charge to the line of credit; determining a discount rate based at least in part on the credit worthiness of the at least one consumer; and applying the discount rate when at least one transaction is made with the credit product; wherein the applied discount rate is adjusted based on the credit worthiness of the at least one consumer.

In accordance with other aspects of this exemplary embodiment of the present invention, the method further comprises the step of dynamically adjusting the discount rate as the credit worthiness of the at least one consumer fluctuates; the credit worthiness is determined by a FICO risk score; the method further comprises the step of assigning a second credit level to a second line of credit associated with the credit product wherein the second line of credit is for general use within a card association network; the second line of credit is dynamically adjusted; the step of determining the discount rate is based at least in part on the credit worthiness of the at least one consumer further comprises the step of determining the discount rate based at least in part on merchant-related data comprising at least one of sales data, inventory data, economy data, type of channel and type of merchandise; the method further comprises the step of dynamically adjusting the discount rate as the merchant-related data is adjusted; a transaction type is identified at a point of sale for routing the transaction to an appropriate network; an interchange fee associated with the general purpose line is based at least in part on the credit worthiness of the at least one consumer; the interchange fee is dynamically adjusted as the credit worthiness of the at least one consumer fluctuates; the step of determining a discount rate involves assigning a table of discount rates and selecting an appropriate discount rate for each transaction; the at least one consumer represents a class of consumers; and the identified one or more merchants are within a closed loop network.

According to another exemplary embodiment of the present invention, a computer implemented system for dynamically adjusting discount rates for a card transaction comprises an issuing module for identifying credit worthiness of at least one consumer; assigning a credit level to a line of credit associated with a credit product for the at least one consumer wherein the credit product is accepted at an identified one or more merchants; and assigning a financing charge to the line of credit; a rate determining module for determining a discount rate based at least in part on the credit worthiness of the at least one consumer; and applying the discount rate when at least one transaction is made with the credit product; wherein the applied discount rate is adjusted based on the credit worthiness of the at least one consumer.

According to another exemplary embodiment of the present invention, a method for implementing a credit card product with multiple lines of credit, the method comprising the steps of implementing a general purpose line with a first credit level; and implementing a private label line with a second credit level different from the first credit level. In accordance with other aspects of this exemplary embodiment of the present invention, the private label line has an adjustable discount rate.

According to another exemplary embodiment of the present invention, at least one signal embodied in at least one carrier wave for transmitting a computer program of instructions configured to be readable by at least one processor for dynamically adjusting discount rates for a card transaction, the computer process comprising identifying means for identifying credit worthiness of at least one consumer; assigning means for assigning a credit level to a line of credit associated with a credit product for the at least one consumer wherein the credit product is accepted at an identified one or more merchants; assigning means for assigning a financing charge to the line of credit; determining means for determining a discount rate based at least in part on the credit worthiness of the at least one consumer; and applying means for applying the discount rate when at least one transaction is made with the credit product; wherein the applied discount rate is adjusted based on the credit worthiness of the at least one consumer.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DETAILED DESCRIPTION OF EXEMPLARY EMBODIMENT(S)

Figure 1:
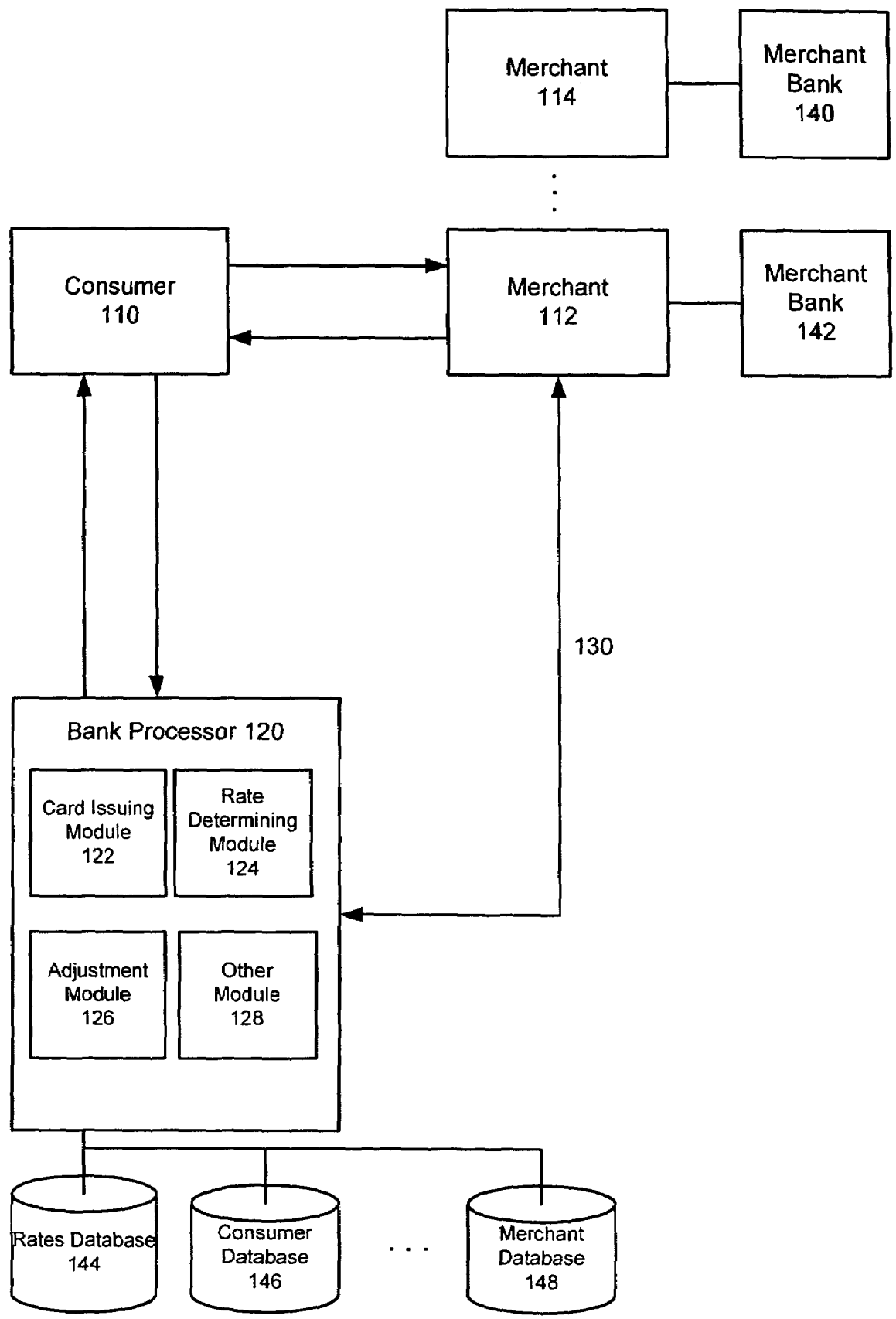
FIG. 1 is a diagram of a system for dynamically adjusting discount rates in a closed loop transaction, according to an embodiment of the present invention.

An embodiment of the present invention generally relates to adjusting discount rates (separately or in combination with finance charges) dynamically over time in accordance with a risk profile and/or net present value of a cardholder or a class of cardholders. Higher risk cardholders may result in higher merchant discounts and lower risk customers may earn lower discounts in accordance with various risk forecasting and/or control algorithms. Other circumstances may warrant other adjustments in discount rates. Specific discount rates may be assigned by cardholder account in accordance with perceived risk and may be dynamically adjusted periodically whenever the risk profile of the cardholder improves or deteriorates. Other factors and considerations may affect the rates.

An aspect of an embodiment of the present invention may be applied to the credit card industry to enable the merchant discount to be adjusted dynamically by account and/or by transaction for a given cardholder at a specific merchant (e.g., merchant location, type of merchant, etc.). However, this exemplary application is not limited to a credit card application and may be used by a credit-grantor with a spectrum of customers of varying risk and may be further applicable where there is a significant segment of customers with marginal credit-worthiness, such as the wireless phone industry. An embodiment of the present invention may be applied to a closed-loop environment where a credit-grantor has more control over the operating environment. This concept may be further adapted for the GPCC, open-loop environment.

An embodiment of the present invention honors current free market industry practices wherein a merchant negotiates to pay a fixed discount rate to an acquirer in exchange for the acquirer purchasing credit card sales provided that they are properly authorized. Currently, this discount varies by type of card and treats most cardholders as "de facto, equally risk-adjusted borrowers." There is a practical limit to charging premium interest rates to consumers because at some point they are counter-productive and adversely impact the cash flow of the borrower and no longer serve to offset the borrower's risk but further exacerbate it.

By variably adjusting the merchant discount in accordance with the borrower's risk, the merchant shares the risk premium with the lender and the cardholder. Indirectly, the merchant may participate in the authorization decision because at some discount rate there will be insufficient margin on the sale for the merchant to bear the premium. Moreover, by including the merchant in a system of variable, risk-adjusted, discount rates, the risk burden may be eased from the cardholder and spread, thereby resulting in greater access to credit for consumers, higher levels of economic activity and enhanced value to society.

Merchants earn a margin on their sales, as represented by a difference between the prices to buyers and the wholesale prices at which goods are purchased. A merchant may then "mark up" the wholesale price to achieve a retail price. Markup is different from gross margin. Gross margin is defined as the difference between wholesale cost and retail price expressed as a percentage of the retail price. Retailers also commonly "mark down" their goods to liquidate inventories or to earn incremental revenues via promotions and sales. For example, if a merchant buys a good at $7.50 and sells it for $10.00, the merchant has marked the product up 33% but his gross margin is 25%.

Mark-up=$2.50/$7.50 (wholesale cost)=33%

Gross margin=$2.50/$10.00 (retail price)=25%

Various sectors in retailing operate with varying gross margins. Within each sector, there are various operating models. For example, large department stores typically operate with a 50% gross margin while big box retailers might operate with 27% gross margin or less. Retailers also serve different audiences in different locales with different input costs, such as land, labor, utilities, taxes, etc. that affect the cost of doing business. Retailers generally adjust their gross margins accordingly. End-user pricing is generally more competitive between the inner and outer suburban rings and is generally higher in inner city and rural areas for various economic and competitive factors. Prices tend to vary regionally and are typically lower in certain geographical areas. Thus, retailers operate a variety of models at varying gross margins to fit economic and competitive factors in their indigenous markets.

According to an embodiment of the present invention, a closed loop model may be implemented. An acquirer, owned or in alliance with an issuer, may negotiate a sliding scale of discount rates which are optimized for various degrees of cardholder credit-worthiness. At some theoretical point, a merchant will decline to sell goods to a high-risk customer because the marginal revenue will be insufficient to earn a profit. This point may be captured and represented by a maximum rate in the sliding scale of discount rates.

The card issuer may issue cards that are accepted by a participating merchant (e.g., a large multi-outlet chain store merchant, etc.) and assign a specific discount rate for each cardholder in accordance with a computer-driven, algorithmically-determined means for assessing the consumer's credit-worthiness and risk. As credit information is gathered over various periods of time from a variety of sources—internal files and external sources (e.g., credit bureaus, public records, etc.)—the card issuer may adjust and/or maintain the assigned discount rates as warranted by changes in the credit behavior of cardholders and the portfolio. Other factors may also be considered, such as type of purchase, item purchased, timing of purchase, price of purchase, frequency of purchase(s), merchant factors, consumer factors, economic data and/or other considerations.

Periodically, the acquirer may review the assigned discounts by classes of risk with the merchant and/or other criteria. As a practical matter, the issuer may justify the discounts, indicate changes in portfolio risk composition, and the mix of business brought to the merchant by the portfolio. When and where appropriate, the sliding scale of discounts may be revised to fit business circumstances and/or other considerations.

An embodiment of the present invention may include various components associated with a card issuer system. For example, an Application Processor feature may evaluate, profile and classify cardholder risk from data derived from application data, external source data, and internal proprietary sources (e.g., historical performance data, customer enterprise data, etc.). A Cardholder Risk-Reward Optimizer feature may optimize new accounts based on a matrix of experimentally derived behavioral data from accounts presenting themselves with like-kind profiles and match the risk of a cardholder against their expected net present value (NPV). An appropriate discount rate may be applied to the cardholder file or to a cross-reference file where the matrix may be applied to meet target rates of return. A unique Bank Identification Number (BIN) may be assigned to accounts operating with variable, risk-adjusted discount rates so that they can be identified and managed differently from other credit cards. A Cardholder Behavioral Data Risk-Reward Optimizer feature may monitor the cardholder economic account usage factors impacting net present value and credit behavior. External data and enterprise data for indications and changes in projected NPV and credit-worthiness may be integrated. When indicated by changes in expected NPV and/or changes in risk of delinquency and loss, an embodiment of the present invention may assign a revised, risk-adjusted discount rate in accordance with the change in economic cardholder behavior and/or risk to obtain a target NPV (or target range). A Multi-Rate Transaction Authorization feature may obtain the risk-adjusted discount rate for transactions emanating from cards with defined BINs and forward the data to the acquirer so that the acquirer may purchase the sale with the specific cardholder, risk-adjusted merchant discount rate. A Merchant Reporting feature enables the card issuer to provide data to the acquirer who may combine the data with the acquirer's data for marketing and maintaining merchant support for the risk-adjusted discount system. Data may include the source of business by class of accounts, aggregate sales brought to the merchant by the portfolio, change in the risk profile of the portfolio, indications of the change in the risk profile by accounts actively purchasing goods with the merchant, and/or other information.

According to another embodiment of the present invention, the acquirer may identify cardholder BINs having risk-adjusted discounts and amend a request for authorization message to request the assigned risk-adjusted discount rate for the cardholder. The acquirer may apply the specific risk-adjusted discount rate by transaction with participating merchants. The acquirer may ensure that the appropriate portion of the merchant discount is forwarded to the issuer. The acquirer may also identify transactions with risk-adjusted discounts originating from participating merchants.

In accordance with another embodiment of the present invention, a single card with a dual credit line for variable, risk-adjusted discount rates are realized. For example, two open-end credit accounts may be accessed by a single card. The card may be issued with provider logos (e.g., VISA™, MCI™, other credit card companies, vendors, service providers, etc.) and run over the provider's specific network(s). The card's function as an identification device may be used to access at least two accounts owned by the same (or affiliated) customer where the accounts have distinguishing transactions, such as transactions carrying risk-adjusted discount rates originating from merchants participating in the risk-adjusted discount program.

For example, one line may have a risk-adjusted interest rate (RAIR) for use in a GPCC environment at merchants that do not participate in the risk-adjusted discount (RAD) program, referred to hereafter as "non-RAD" merchants. According to one example, this line may be a minimum line sufficient to meet the requirements to offer pre-approved credit. A second line may be reserved for transactions carrying risk-adjusted discount(s) (RAD) from merchants participating in risk-adjusted discount programs ("RAD merchants") and may carry an APR lower than the RAIR line. In this example, the second line is the larger of the two lines. The issuer may post authorized transactions from RAD merchants to the RAD line and post transactions from non-RAD merchants to the RAIR line. Other conditions may apply. Further, additional lines may be implemented. In some cases, dual credit lines may be adjusted monthly, daily, seasonally, hourly or based on other time periods, which may be periodic or in response to a trigger event.

The card issuer may develop payment options for a cardholder so that the cardholder may have a single payment applied to a preferred line or to multiple lines as the cardholder wishes. These choices may be made available on a remittance document (or other document or communication) where a default position may be to apply the principal portion of the payment proportionately equal to two or more lines. Other defaults may be defined. A remittance processing system may automatically read the remittance document with an indicated payment option selected by the cardholder or may accept operator keystrokes to apply the payment for posting in accordance with the cardholder's choice. Cash advances may be available against the RAIR line. According to an exemplary application, charge requests which exceed the available RAD line may be applied to the RAIR line if available, but excess charges to the RAIR line may not be placed against the RAD line. Other scenarios may apply.

When the cardholder presents a card for payment at a participating RAD merchant and the card is run through the authorization terminal, the BIN will indicate to the acquirer that the card has a RAD line and trigger the request for the RAD assigned to the cardholder from the issuer in addition to requesting an authorization over the card association network. When the transaction is purchased, the acquirer will deduct a portion of the discount, compute the association portion of the discount, forward the amount to the association for compensation for network services, and send the balance of the discount to the issuer. In the GPCC environment, the standard interchange fee may be forwarded to the issuer and as such would result in the discount premium accruing to the acquirer and not the issuer who is the risk-bearer. If the merchant is a non-RAD merchant, the transaction may be handled in accordance with the process and procedures for a general GPCC transaction.

According to an embodiment of the present invention, a method and system are directed to dynamically adjusting discount rates in a closed loop transaction based on factors, such as consumer risk and/or consumer credit worthiness, for shifting the compensation of the risk to a merchant entity. According to an embodiment of the present invention, a risk-based discount rate structure may be applied to a consumer account where the cost of the risk premium may be shifted from the consumer via a finance charge to the merchant via a discount rate. By adjusting the discount rate paid by the merchant, a higher discount rate may be applied to a purchase made by a riskier consumer in a closed loop transaction. As a result, rather than increasing the financing charge, the merchant pays a higher percentage of the purchase to compensate for the consumer's risk. Therefore, the consumer is able to make transactions without the higher financing charge. As the consumer's risk or credit worthiness changes (e.g., improves or deteriorates), the discount rate may be adjusted accordingly. Similarly, a lower discount rate may also be applied.

An embodiment of the present invention relates to a method and system for compensating or covering the credit risk of a cardholder by varying the discount rate within an acceptable range of a merchant in accordance with the changing risk of the individual credit customer or consumer. Also, other factors may have an affect on the discount rate. For example, the discount rate may be adjusted based on the channel in which a product is being purchase. For example, Internet purchases may have a different risk profile as compared to store purchases. Other considerations may include type of purchase, merchant data, type of merchant, price of purchase, timing of purchase, transaction data, etc. Other external considerations may include economic data, events (e.g., world events, political events, etc.) and/or other factors.

FIG. 1 is a diagram of a system for dynamically adjusting discount rates in a closed loop transaction, according to an embodiment of the present invention. In this example, a Consumer 110 may make a purchase of goods and/or services at Merchant 112, 114. The purchase may be made by passing a card through a merchant's point of sale (PoS) device, for example, or other mode of credit card transactions, including phone order, Internet, wireless communications, etc. The card transaction may be made by providing a card number or other identifier. In addition, a consumer may represent an individual, a small business or other consumer entity. Discount rates may be adjusted by channel, size and/or type of transaction. Other characteristics associated with the merchandise, vendor or transaction itself may be considered. For example, for a large ticket item, such as $5000 television, the discount rate may be adjusted based on the size of the transaction where the discount rate may be capped at a certain limit amount.

An embodiment of the present invention is directed to adjusting financing charges and credit levels based on a consumer's credit worthiness or risk, which may include a credit score or FICO score, behavior data including payment history, timeliness of payment, amount of payment (e.g., total payoff, partial payoff, etc.), delinquency data and other data associated with the consumer. Other factors may also be considered, including merchant related data, transaction data, etc. For example, the discount rate may be adjusted dynamically to compensate for riskier consumers and/or the creditworthiness of the consumer.

Bank Processor 120 may represent a credit card issuer or other similar entity. In this example, Bank Processor 120 may include various modules including Card Issuing Module 122, Rate Determining Module 124, Adjustment Module 126 and other module 128, which may represent other functionality. Card Issuing Module 122 of Bank Processor 120 may issue a consumer a product for making purchases, such as a credit card product.

In a closed loop transaction, Merchant 112 may transmit a request for purchase authorization to Bank Processor 120, as shown by 130. In a closed loop transaction, interaction with a Merchant Acquirer and/or Card Association may be avoided.

Upon receiving the request for purchase authorization, Bank Processor 120 may access a consumer credit file (or other indication of risk rating), which may be stored and accessed at Consumer Database 146. The consumer credit file may include consumer data, credit worthiness data, consumer risk data, consumer behavior data, etc. A table (or other format) of discount rates for each consumer may be stored in Rates Database 144. Merchant-related data may be stored in database 148. The data stored in these databases may be received from various sources, including external sources. By accessing a discount rate table associated with the consumer, Bank Processor 120 may apply an appropriate discount rate for the transaction. Other sources of rate information may also be accessed. In this example, Bank Processor 120 may transmit a purchase authorization with the appropriate discount rate to be applied. For a riskier consumer, a higher discount rate may be applied than for a less risky consumer. Also, for certain transactions, a higher discount rate may be applied to a riskier transaction, such as diamond jewelry over the Internet, as opposed to a less risky transaction, such as purchasing college books at the university book store. Seasonal considerations may also be a factor. For example, it may be common knowledge in the floral industry that a large amount of fraud occurs during Mother's day. Therefore, these purchases may be considered more risky transactions and discounts rates may be adjusted accordingly. As rates may be increased for riskier consumers (or transactions), rates may also be decreased for less risky consumers (or transactions).

After the transaction, Bank Processor 120 may transmit a bill or other request for payment to Consumer 110 in accordance with the cardholder agreement with the issuer(s). Payment may be made to Bank Processor 120. Bank Processor 120 may then settle the payment with a merchant designated entity, such as Merchant Bank 140, 142.

As a general rule, Merchants want to increase sales and increase the real income from most or all consumers, including riskier consumers. A Merchant may be willing to increase gross sales at the expense of the net sales based on the margins received on the sales. Therefore, an embodiment of the present invention is directed to shifting the risk (or compensation for the high premium) to the merchant and offering a lower interest rate to the consumer. For example, rather than raising the interest rate for a riskier consumer to 20%, the consumer is charged 15% and the merchant discount rate is adjusted to compensate for the risk.

Figure 2:
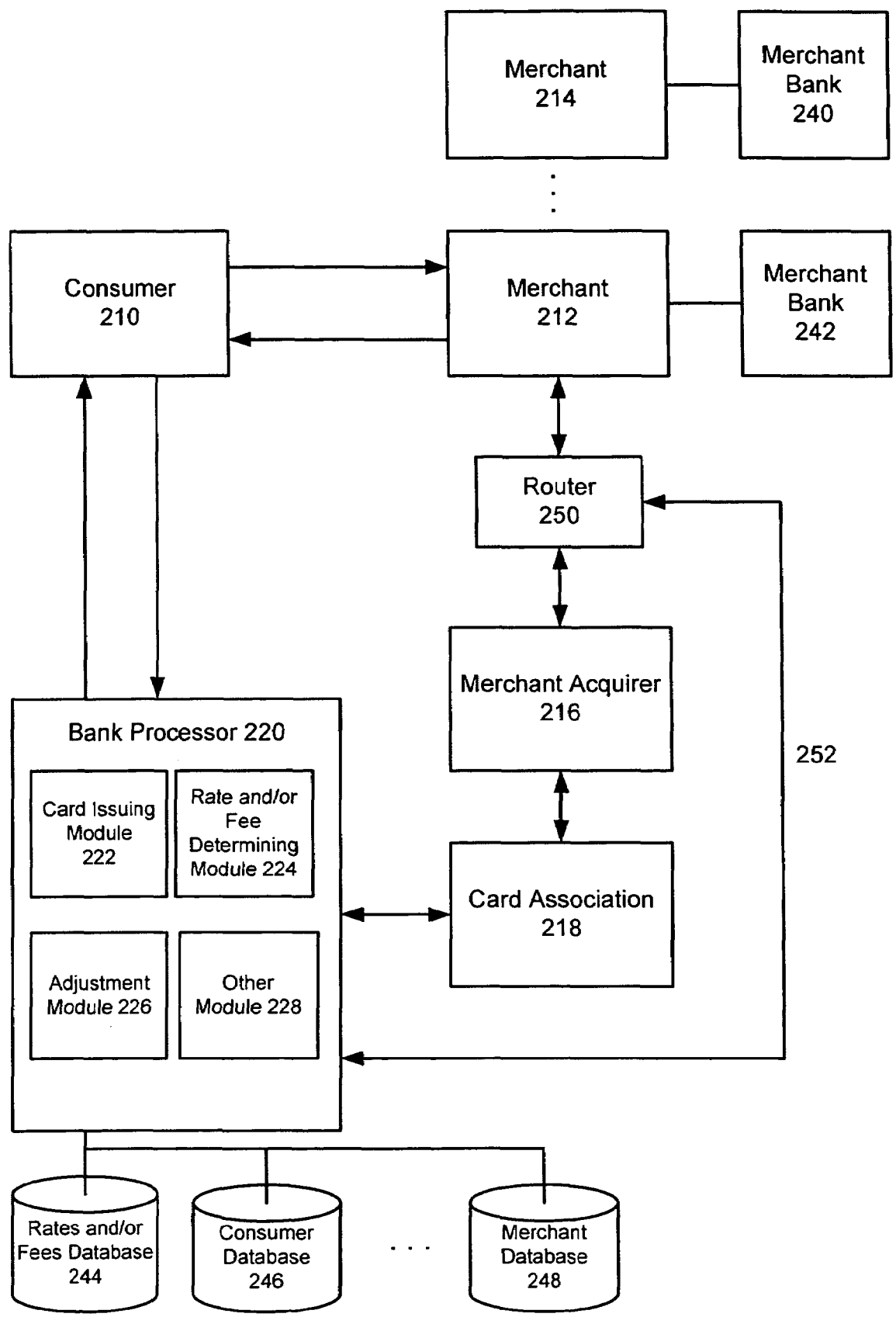
FIG. 2 is a diagram of a system for dynamically adjusting discount rates, according to an embodiment of the present invention.

FIG. 2 is a diagram of a system for dynamically adjusting discount rates, according to an embodiment of the present invention. Bank Processor 220 may represent a credit card issuer or other similar entity. In this example, Bank Processor 220 may include various modules including Card Issuing Module 222, Rate and/or Fee Determining Module 224, Adjustment Module 226 and other module 228, which may represent other functionality. Card Issuing Module 222 of Bank Processor 220 may issue a consumer a product for making purchases, such as a credit card product.

Consumer 210 may engage in a transaction through Merchant 212. The transaction may be performed at a Merchant's point of sale, via phone order, via the Internet or other mode of communication. The transaction may involve the purchase (or lease) of goods and/or services. Consumer 210 may provide the credit card at the point of sale or provide the associated account number or other identifier to the Merchant via a preferred mode of communication, such as Internet, phone order, wireless communication, etc. In addition, a consumer may represent an individual, a small business or other consumer entity.

According to an example of an embodiment of the present invention, the credit card product may have two lines of credit. The first line of credit may be a general purpose line and the second line of credit may be a closed loop line. The general purpose line may be used anywhere the card is accepted and is generally assigned a lower credit limit. The closed loop line may be used at specified merchants where the discount rate may be adjusted based on the consumer credit worthiness, for example. The lines of credit, credit level, interest rate and/or other criteria may be determined based on consumer data, merchant data and/or other data. According to an embodiment of the present invention, the Card Issuing Module 222 may also identify credit worthiness of at least one consumer, assign a credit level to each line of credit associated with a credit product for the at least one consumer and assign a financing charge to each line of credit.

In another example, Router 250 may be implemented to determined an appropriate line of credit. Router 250 may be separate or combined with Merchant 212. For example, Router 250 may identify charges at the point of sale, so that the transaction may be identified as a closed loop transaction, a card association network transaction or other type of transaction. Depending on the type of transaction, Router 250 may route the request to an appropriate environment. For example, for a general purpose line, the transaction may be routed through Merchant Acquirer 216 and Card Association 218. For a closed loop transaction, the transaction may be routed through a separate channel, as shown by 252.

The consumer may define or select conditions or preferences when determining the appropriate line of credit. For example, the consumer may specify that all eligible charges are applied to the general purpose line first. If charges are not eligible for the first credit line, then the second line will be applied. In another example, the consumer may prefer to use the closed loop line first and all other charges to be applied to the general purpose line. In another example, a certain portion or percentage of each transaction may be applied to the general purpose line and to the closed loop line for eligible transactions. Other conditions or preferences may be applied.

For example, the consumer may use the GPCC credit line with all merchants accepting the card, but may use a second level "closed loop card" with a specific merchant who has a closed loop relationship with the card issuer. Where both lines are accepted at a merchant, the lower cost line of credit may be used first, until that line is exhausted. Any amount over the GPCC line may be automatically charged to the "closed loop card."

For a general purpose transaction, Merchant Acquirer 216 may electronically collect information related to the purchase. The data may include card number, purchase amount and/or other information related to the transaction. The data may be sent to a Card Association 218 to obtain permission to authorize the transaction. For example, Merchant Acquirer 216 may send a purchase authorization request for the credit card transaction. Merchant 212 may represent any entity selling or providing products and/or services to a consumer through a merchant facility (point of sale), via phone, via Internet or other method of conducting business. Merchant Acquirer 216 may represent a payment system for allowing merchants (or other retail clients) to accept various types of electronic payment. Card Association 218 may represent a credit card company (e.g., VISA™, MasterCard™, American Express™, etc.).

For the closed loop transaction or a portion of the purchase applied to the closed loop line of credit, the purchase authorization request may be sent to Bank Processor 220. By accessing a consumer file for the consumer, an appropriate table of discount rates (or other format) may be accessed. If eligible, Bank Processor 220 may then return purchase authorization message to the Merchant and an appropriate discount rate for the transaction.

For example, the credit card may include (1) a general purpose line with a lower credit level (e.g., $200) which may be used anywhere the credit card is accepted and (2) a private label line with a higher credit level (e.g., $1200) which may be used at a specified venue, such as one or more specific merchants. While the first credit line may be for general-purpose use in a card association network (e.g., VISA™ network, etc.), the second credit line may be a closed loop (e.g. not through the card association network) with a participating one or more merchants. In this example, the discounts rates of the closed loop line may be adjusted based on consumer risks, merchant data and/or other considerations. According to one example, the closed loop line may have an adjustable level of discount rate based on the riskiness of the consumer (and/or other factors) where interaction with a card association is avoided. The general purpose line may have a lower credit limit and use a standard discount rate and/or interchange fee through a card association. Each periodic (e.g., monthly) payment may be calculated and applied against the multiple lines of credit.

Further, additional lines of credit may be implemented, in accordance with an embodiment of the present invention. For example, an additional third credit line with a third credit level with an adjusted discount rate for a specified venue (e.g., another one or more merchants) may be implemented. In accordance with an embodiment of the present invention, additional credit lines with adjusted discount rates may be implemented. In addition, the discount rates may be adjusted based on merchant considerations. For example, for merchants selling higher priced items, such as a furniture store, jewelry store, etc., a higher adjusted discount rate may be implemented. In another example, for a national chain of discount stores, a lower adjusted discount rate may be implemented. Similarly, an individually owned merchant may not have the resources of pay a higher discount rate for each transaction. Other merchant factors may be considered.

Discount rates may be determined at Rate and/or Fee Determining Module 224 of Bank Processor 220. These rates may be based on consumer data, such as consumer risk and/or credit worthiness, as well as merchant data. Other factors and considerations (e.g., transaction type, amount of purchase, historical data, economic data, etc.) may also affect the rates. In addition, other rates and/or fees within the credit card transaction may also be adjusted in accordance with an embodiment of the present invention. In view of changes in circumstances, consumer and/or merchant related data may be used to subsequently adjust the discount rates by Adjustment Module 226. The discount rates (and/or interchange fees, as discussed below) may be stored in database 244. Consumer data, credit worthiness data may be stored in database 246. Merchant-related data may be stored in database 248. The data stored in these databases may be received from various sources, including external sources. After receiving a bill or other statement, consumer 210 may make a payment to a Card Issuing Bank (or Bank Processor 220). The payment may be settled with a merchant designated entity, such as Merchant bank 240, 242.

For example, a co-branded merchant may make 50% margin or a discount merchant may make 27% gross margin. Thus, the incremental revenue of a high risk consumer will be justified because of the marginal revenue will offset the marginal cost. Using a Card Association system (e.g., the VISA system), with 250 basis points, the merchant has $50 in goods and sells the goods for $100 to a customer, and receives $97.50 from the credit card company. A $2.50 fee (2.5%) is experienced by the merchant where the merchant earns a gross margin of $47.50. In another transaction, the consumer may not have access to a standard GPCC because the consumer's weaker credit-worthiness may not qualify for a dual-line card with a closed-loop line. In such a case, a merchant pays 7.5% discount (or other percentage). The merchant may receive $92 from card issuer (e.g., Bank Processor, etc.). In this example, the merchant may withstand a much higher loss rate, such as 8-10%, where the discount rate may be based on individual consumer risk.

According to an embodiment of the present invention, more business with consumers of less then prime credit may be conducted by adjusting a discount rate for a closed loop transaction. In addition, discount rates may be adjusted based on consumer data (and/or other data) and may further be dynamically adjusted at the point of sale. Rather than changing the consumer's interest rate (e.g., raising the interest rate), an embodiment of the present invention encourages more business by having the merchant pay more of the discount rate (e.g., compensating for the credit risk of the consumer).

Figure 3:
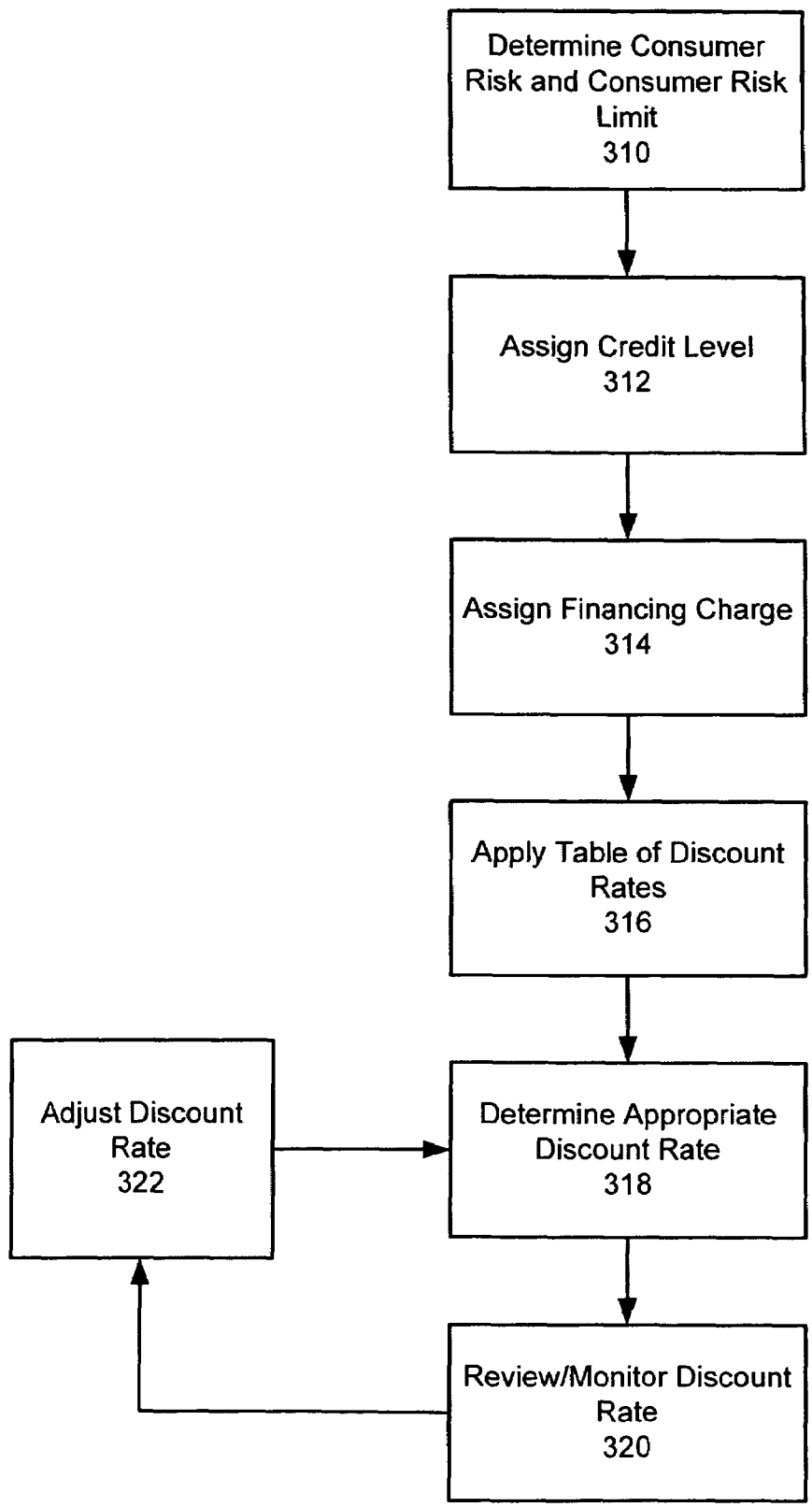
FIG. 3 is a flowchart illustrating a method for adjusting a line of credit for a closed loop transaction, according to an embodiment of the present invention.

FIG. 3 is a flowchart illustrating a method for adjusting a line of credit for a closed loop transaction, according to an embodiment of the present invention. At step 310, consumer risk and consumer risk limit may be determined. Consumer risk may include credit worthiness, etc. This information may be obtained through a scoring algorithm, such as a Fair Isaac and Company (FICO) score. A consumer risk limit may represent a threshold point where it becomes unprofitable to extend credit to the consumer. For example, a merchant may calculate a threshold point where an incremental sale is not worth the incremental cost of credit for substandard consumer. Other risk factors may be assessed and considered. At step 312, an appropriate credit level may be assigned. At step 314, an appropriate financing charge may be assigned to the credit level of the closed loop transaction. Other restrictions and/or conditions may be applied as well. At step 316, a table of discounts rates may be applied. For example, a bank processor may append an indication of risk to a card member file, which may include a table of discounts rates related to that individual consumer's risk. At step 318, an appropriate discount rate may be determined for a transaction. The discount rate may be used to determine how much the bank processor receives from the Merchant. At step 320, the merchant and/or bank processor may periodically (e.g., monthly, quarterly, etc.) review or monitor the discount rate versus risks to understand the cost of sales (and/or other data) and further trace the risk ratings of the consumer. At step 322, adjustments to the discount rate may be made, based on certain information, such as change in a consumer's credit worthiness status, merchant related factors (e.g., sales, inventory, business reasons, etc.) as well as size of transaction, type of transaction, type of merchandise, transaction channel, and/or other factors.

Figure 4:
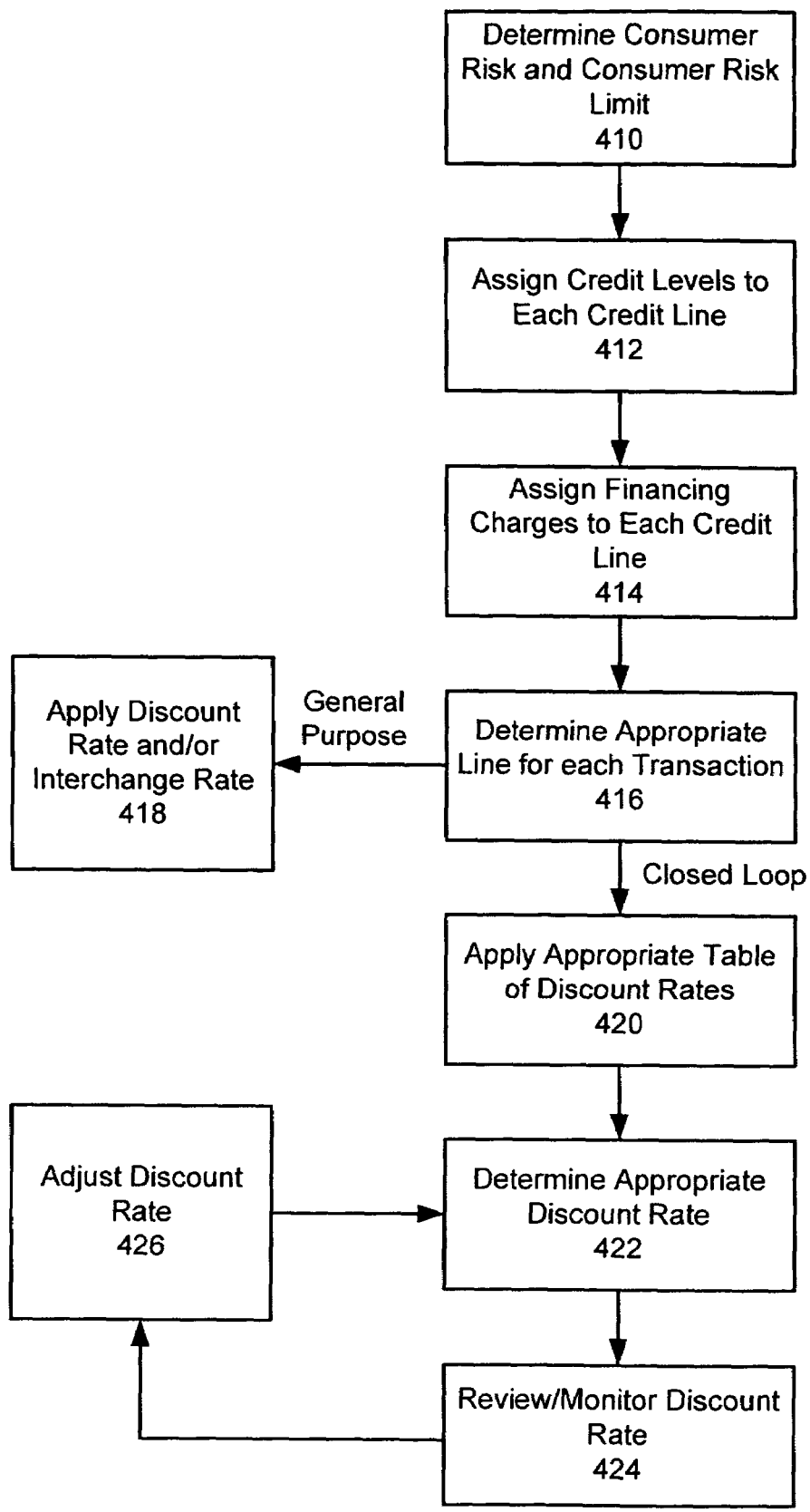
FIG. 4 is a flowchart illustrating a method for adjusting a line of credit for a dual card transaction, according to an embodiment of the present invention.

FIG. 4 is a flowchart illustrating a method for adjusting a line of credit for a dual card transaction, according to an embodiment of the present invention. At step 410, consumer risk and consumer risk limit may be determined. Consumer risk may include credit worthiness, etc. This information may be obtained through a scoring algorithm, such as a FICO score. A consumer risk limit may represent a threshold point where it becomes unprofitable to extend credit to the consumer. Other risk factors may be assessed and considered. At step 412, an appropriate credit level may be assigned to each line of credit. At step 414, an appropriate financing charge may be assigned to each line of credit level. Other restrictions and/or conditions may be applied as well. At step 416, an appropriate line of credit may be determined for a transaction. For a general purpose transaction, a standard discount rate and/or interchange fee may be applied, at step 418. For a closed loop transaction, an appropriate table of discount rates may be applied, at step 420. For example, a bank processor may append an indication of risk to a card member file, which may include a table of discounts rates and/or interchange fees related to that individual consumer's risk. At step 422, an appropriate discount rate may be determined. The discount rate may be used to determine how much the Bank Processor receives from the Merchant. At step 424, the merchant and/or bank processor may periodically (e.g., monthly, quarterly, etc.) review the discount rate versus risks to understand the cost of sales (and/or other data) and further trace the risk ratings of the consumer. At step 426, adjustments to the discount rate may be made, based on certain information, such as change in a consumer's credit worthiness status, merchant related factors (e.g., sales, inventory, business reasons, etc.) as well as size of transaction, type of transaction, type of merchandise, transaction channel, and/or other factors.

Figure 5:
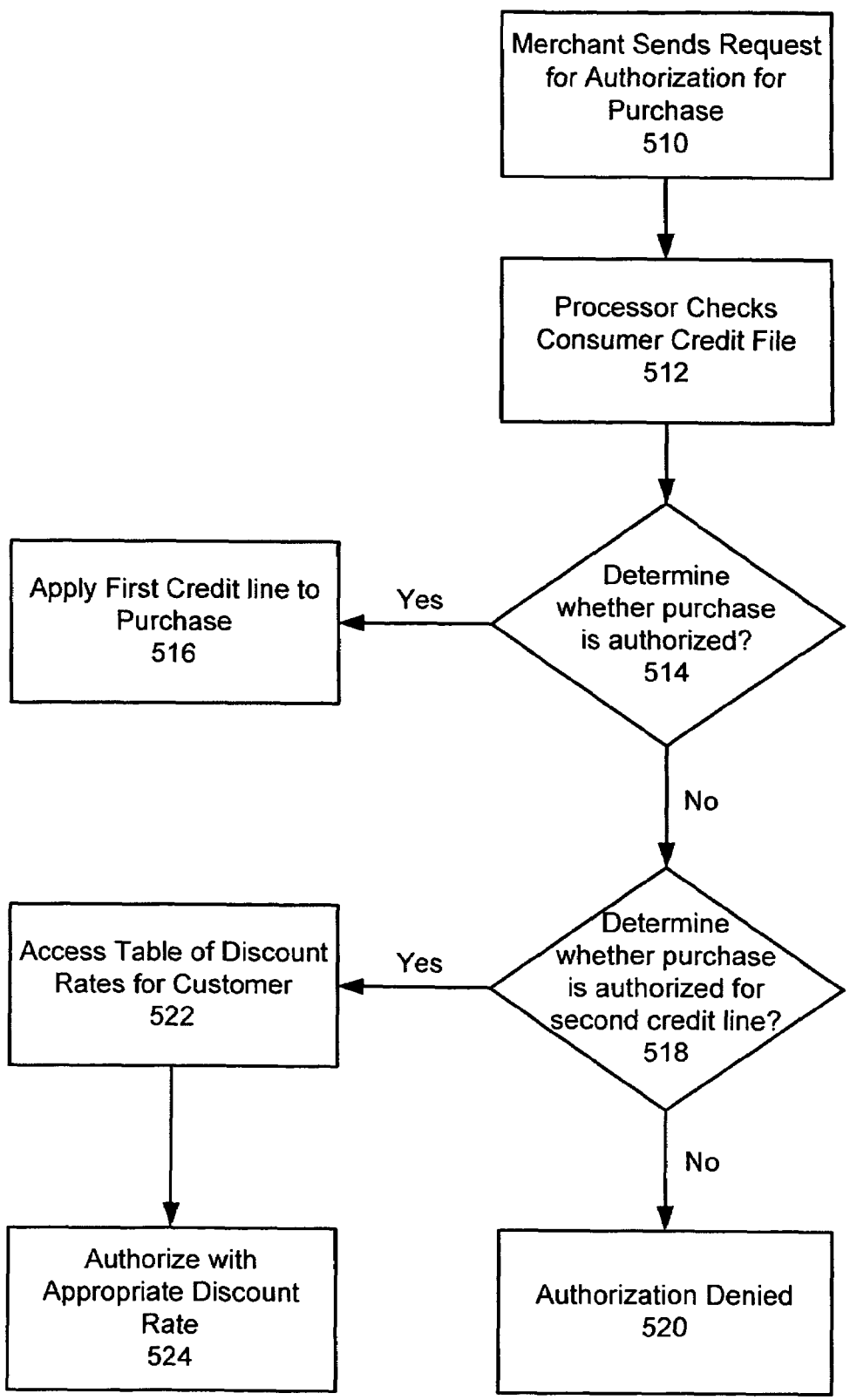
FIG. 5 is a flowchart illustrating a method for implementing a dual card, according to an embodiment of the present invention.

FIG. 5 is an example of a flowchart illustrating a method for implementing a dual card, according to an embodiment of the present invention. At step 510, a merchant may send a request for authorization for a purchase requested by a consumer. At step 512, a processor may access a consumer credit file associated with the consumer requesting the purchase. At step 514, it may be determined whether the purchase is authorized for a first line of credit. If the purchase is authorized, the first line of credit may be used for the purchase. In this example, the first line of credit may be a general purpose line and the second line of credit may be the closed loop line. If the purchase is not authorized for the first line of credit (e.g., general purpose line), it may be determined whether the purchase is authorized by the second credit line (e.g., closed loop line). If not, the authorization request is denied, at step 520. If the purchase is authorized for the second credit line, a table of discount rates for the consumer may be accessed at step 522. At step 524, an appropriate discount rate may be applied to the purchase. In another example, the first line of credit may represent a closed loop line and the second credit line may represent a general purpose line. Other variations may be implemented.

A system of an embodiment of the present invention may allow an entity (e.g., Card Issuing Bank, Bank Processor, etc.) to compete with private labels that serve a non-prime segment where consumer riskiness is adjusted through higher finance charges to the consumers.

According to another embodiment of the present invention, an interchange fee for the general purpose line may also be dynamically adjusted based on consumer data as well as other data. Interchange fees generally include fee paid by a Merchant via Merchant Acquirer to a credit card issuer, such as Card Issuing Bank, for transactions that are processed through Interchange. In accordance with an embodiment of the present invention, the interchange fees may be adjusted based on consumer risk, including consumer credit worthiness and/or other data.

A process of determining a discount rate and/or interchange fee may be based on consumer data (e.g., individual risk), merchant data (e.g., sales data, inventory, etc.) and/or other data and may be adjusted dynamically. Consumer data may include consumer credit worthiness, consumer risk, triggering events and/or other data related to a consumer's ability to pay for a transaction. For example, the discount rate and/or interchange fee may be raised and lowered based on changing risk scores (e.g., FICO, etc.) as well as other factors and considerations. In addition, predetermined triggering events may also adjust the discount rate and/or interchange fee. For example, triggering events may include bankruptcy, an account reaching a certain level, life events or other triggers.

Other factors that may affect discount rates and/or interchange fees may include merchant-based considerations, such as sales data, business needs, etc. For example, some merchants may take into consideration certain factors such as seasons (e.g., holidays), world events, inventory, etc. In addition, during slow periods (e.g., recession, slow economy, low consumer confidence, etc.) merchants may adjust the discount rates and/or interchange fees accordingly to encourage more spending. For example, during a busy spending season, such as Christmas, the discount rates and/or interchange fees may be adjusted to encourage more spending. In this example, a popular toy store during Christmas time may increase sales by adjusting discount rates and/or interchange fees according to consumer risk and/or merchant data. The toy store could tolerate a higher discount because they have a higher margin, and further increase their incremental sales. Therefore, an appropriate discount rate and/or interchange fee may be based on consumer data, merchant data, a combination thereof, and/or other information. In another example, discount rates may be adjusted by using a multiplier. This method may also be applied to adjust interchange fees. An embodiment of the present invention may involve adding a multiplier based on the riskiness of the individual, with the merchant accepting more of the risk. For example, a merchant may be charged a specific interchange rate.

Another embodiment involves consumers with higher credit worthiness receiving more rewards, better prices, and perhaps the interchange rate would be discounted on the spot. Less credit worthy consumers may receive less or zero rewards, and perhaps even a higher price at the POS, because the merchant is taking more risk. In addition, the rates may be adjusted higher or lower depending on the amount of risk, as well as other considerations.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the following appended claims. Further, although the present invention has been described herein in the context of a particular implementation in a particular environment for a particular purpose, those of ordinary skill in the art will recognize that its usefulness is not limited thereto and that the present invention can be beneficially implemented in any number of environments for any number of purposes. Accordingly, the claims set forth below should be construed in view of the full breath and spirit of the present invention as disclosed herein.

The invention claimed is:

1. An automated computer implemented method for dynamically adjusting discount rates for a card transaction, wherein the method is executed by a programmed computer processor, the computer implemented method comprising the steps of:

identifying credit worthiness of at least one consumer, at an issuing module using the programmed computer processor;

assigning a first credit level to a line of credit associated with a credit product for the at least one consumer, at the issuing module using the programmed computer processor, wherein the credit product is accepted at an identified one or more merchants, wherein at least one of the identified one or more merchants is within a closed loop network;

assigning a second credit level to a second line of credit associated with the credit product, at the issuing module using the programmed computer processor, wherein the second line of credit is for general use within a card association network;

assigning a first financing charge to the first line of credit;

assigning a second financing charge to the second line of credit, at the issuing module using the programmed computer processor, wherein the first financing charge is different from the second financing charge;

determining a discount rate for at least one transaction based at least in part on the credit worthiness of the at least one consumer and based at least in part on merchant-related data, using the programmed computer processor; and applying the discount rate when at least one transaction is made with the credit product at the identified one or more merchants within the closed loop network, at the rate determining module using the programmed computer processor wherein the discount rate is paid by the identified one or more merchants;

wherein the discount rate is dynamically adjusted as the credit worthiness of the at least one consumer changes.

2. The method of claim 1, wherein the credit worthiness is determined by a FICO risk score.

3. The method of claim 1, wherein the second line of credit is dynamically adjusted.

4. The method of claim 1, wherein the step of determining the discount rate is based at least in part on the credit worthiness of the at least one consumer further comprises the step of:

determining the discount rate based at least in part on merchant-related data comprising at least one of sales data, inventory data, economy data, type of channel and type of merchandise.

5. The method of claim 4, further comprising the step of:

dynamically adjusting the discount rate as the merchant-related data is adjusted.

6. The method of claim 1, wherein a transaction type is identified at a point of sale for routing the transaction to an appropriate network.

7. The method of claim 1, wherein an interchange fee associated with the general purpose line is based at least in part on the credit worthiness of the at least one consumer.

8. The method of claim 7, wherein the interchange fee is dynamically adjusted as the credit worthiness of the at least one consumer fluctuates.

9. The method of claim 1, wherein the step of determining a discount rate involves assigning a table of discount rates and selecting the appropriate discount rate for each transaction.

10. The method of claim 1, wherein the at least one consumer represents a class of consumers.

11. The method of claim 1, wherein the identified one or more merchants are within a closed loop network.

12. A computer implemented system for dynamically adjusting discount rates for a card transaction, the computer implemented system comprising: a processor;

an issuing module for identifying credit worthiness of at least one consumer; assigning a first credit level to a line of credit associated with a credit product for the at least one consumer wherein the credit product is accepted at an identified one or more merchants within a closed loop network; assigning a second credit level to a second line of credit associated with the credit product wherein the second line of credit is for general use within a card association network; and assigning a first financing charge to the line of credit; and assigning a second financing charge to the second line of credit, wherein the first financing charge is different from the second financing charge;

a rate determining module for determining a discount rate for at least one transaction based at least in part on the credit worthiness of the at least one consumer and based at least in part on merchant-related data; and applying the discount rate when the at least one transaction is made with the credit product at the identified one or more merchants within the closed loop network, wherein the discount rate is paid by the identified one or more merchants;

wherein the discount rate is dynamically adjusted as the credit worthiness of the at least one consumer; and wherein the processor, the issuing module, the rate determining module are interoperatively connected.

13. The system of claim 12, wherein the credit worthiness is determined by a FICO risk score.

14. The system of claim 12, wherein the second line of credit is dynamically adjusted.

15. The system of claim 12, wherein the discount rate is further based at least in part on merchant-related data comprising at least one of sales data, inventory data, economy data, type of channel and type of merchandise.

16. The system of claim 15, wherein the discount rate is dynamically adjusted as the merchant-related data is adjusted.

17. The system of claim 12, wherein a transaction type is identified at a point of sale for routing the transaction to an appropriate network.

18. The system of claim 12, wherein an interchange fee associated with the general purpose line is based at least in part on the credit worthiness of the at least one consumer.

19. The system of claim 18, wherein the interchange fee is dynamically adjusted as the credit worthiness of the at least one consumer fluctuates.

20. The system of claim 12, wherein the rate determining module assigns a table of discount rates and identifies the appropriate discount rate for each transaction.

21. The system of claim 12, wherein the at least one consumer represents a class of consumers.

22. The system of claim 12, wherein the identified one or more merchants are within a closed loop network.

23. A computer program of instructions configured to be readable by at least one programmed computer processor to execute a computer process for performing the method as recited in claim 1.

24. An automated method for implementing a credit card product with multiple lines of credit, wherein the method is executed by a programmed computer processor, the method comprising the steps of:

implementing a general purpose line with a first credit level, at the issuing module using the programmed computer processor; and implementing a private label line with a second credit level different from the first credit level, at the issuing module using the programmed computer processor;

wherein a first discount rate is applied to the general purpose line and a second discount rate based at least in part on the credit worthiness of the at least one consumer and based at least in part on merchant-related data is applied the private label line and wherein the first discount rate is different from the second discount rate; and wherein the second discount rate is paid by one or more merchants associated with the private label line.

25. The method of claim 24, wherein the private label line has an adjustable discount rate.

26. A credit card product with multiple lines of credit, the credit card product comprising:

a general purpose line with a first credit level; and a private label line with a second credit level different from the first credit level;

wherein a first discount rate is applied to the general purpose line and a second discount rate based at least in part on the credit worthiness of the at least one consumer and based at least in part on merchant-related data is applied the private label line and wherein the first discount rate is different from the second discount rate; and wherein the second discount rate is paid by one or more merchants associated with the private label line.

27. The product of claim 26, wherein the private label line has an adjustable discount rate.

28. A computer program of instructions configured to be readable by at least one processor for dynamically adjusting discount rates for a card transaction, the computer program comprising:

identifying means for identifying credit worthiness of at least one consumer;

assigning means for assigning a credit level to a line of credit associated with a credit product for the at least one consumer wherein the credit product is accepted at an identified one or more merchants;

assigning means for assigning a financing charge to the line of credit;

determining means for determining a discount rate for at least one transaction based at least in part on the credit worthiness of the at least one consumer and based at least in part on merchant-related data; and applying means for applying the discount rate when at least one transaction is made with the credit product wherein the discount rate is paid by the identified one or more merchants;

wherein the applied discount rate is adjusted based on the credit worthiness of the at least one consumer;

wherein at least one of the identified one or more merchants is within a closed loop network.

29. An automated computer implemented method for dynamically adjusting discount rates for a card transaction, wherein the method is executed by a programmed computer processor, the computer implemented method comprising the steps of:

identifying credit worthiness of at least one consumer, using the programmed computer processor;

assigning a credit level to a line of credit associated with a credit product for the at least one consumer, using the programmed computer processor, wherein the credit product is accepted at an identified one or more merchants within a closed loop network;

assigning a financing charge to the line of credit, using the programmed computer processor;

determining a discount rate for at least one transaction based at least in part on the credit worthiness of the at least one consumer and merchant-related data comprising at least one of sales data, inventory data, and economy data, wherein the credit worthiness is determined by a FICO risk score, using the programmed computer processor;

assigning a second credit level to a second line of credit associated with the credit product, using the programmed computer processor, wherein the second line of credit is for general use within a card association network;

applying the discount rate when the at least one transaction is made with the credit product, using the programmed computer processor; wherein a transaction type is identified at a point of sale for routing the transaction to an appropriate network; wherein the discount rate is paid by the identified one or more merchants; and dynamically adjusting the discount rate as the credit worthiness of the at least one consumer fluctuates and dynamically adjusting the discount rate as the merchant-related data is adjusted, using the programmed computer processor;

wherein the applied discount rate is adjusted based on the credit worthiness of the at least one consumer; wherein an interchange fee associated with the general purpose line is based at least in part on the credit worthiness of the at least one consumer; and the interchange fee is dynamically adjusted as the credit worthiness of the at least one consumer fluctuates.

30. An automated computer implemented method for dynamically adjusting discount rates for a card transaction, wherein the method is executed by a programmed computer processor, the computer implemented method comprising the steps of:

identifying credit worthiness of at least one consumer, using the programmed computer processor;

assigning a credit level to a line of credit associated with a credit product for the at least one consumer, using the programmed computer processor;

assigning a financing charge to the line of credit, using the programmed computer processor;

determining a discount rate for at least one transaction based at least in part on the credit worthiness of the at least one consumer and merchant-related data comprising at least one of sales data, inventory data, and economy data, wherein the credit worthiness is determined by a risk score, using the programmed computer processor;

assigning a second credit level to a second line of credit associated with the credit product, using the programmed computer processor, wherein the second line of credit is for general use within a card association network;

applying the discount rate when at least one transaction is made with the credit product, using the programmed computer processor; wherein a transaction type is identified at a point of sale for routing the transaction to an appropriate network; wherein the discount rate is paid by the identified one or more merchants; and dynamically adjusting the discount rate as the credit worthiness of the at least one consumer fluctuates and as the merchant-related data is adjusted, using the programmed computer processor;

wherein the applied discount rate is adjusted based on the credit worthiness of the at least one consumer; wherein an interchange fee associated with the general purpose line is based at least in part on the credit worthiness of the at least one consumer; and the interchange fee is dynamically adjusted as the credit worthiness of the at least one consumer fluctuates.

\* \* \* \* \*

UNITED STATES PATENT AND TRADEMARK OFFICE
CERTIFICATE OF CORRECTION

PATENT NO. : 7,624,068 B1
APPLICATION NO. : 10/920398
DATED : November 24, 2009
INVENTOR(S) : Heasley et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1063 days.

Signed and Sealed this

Twenty-sixth Day of October, 2010

David J. Kappos
*Director of the United States Patent and Trademark Office*